2,940,840
HYDROCARBON CONVERSION PROCESS

James H. Shapleigh, Wilmington, Del., assignor to Hercules Powder Company, Wilmington, Del., a corporation of Delaware No Drawing. Filed Dec. 31, 1956, Ser. No. 631,470

18 Claims. (Cl. 48—215)

This invention relates to the conversion of hydrocarbons heavier than methane. In one aspect this invention relates to a two stage process for the manufacture of hydrogen from hydrocarbon oils. In one aspect this invention relates to the catalytic conversion of hydrocarbons employing higher throughputs than heretofore. In another aspect this invention relates to a two stage process for the conversion of hydrocarbons wherein the first stage is catalytic and a space velocity is employed which is sufficiently high to overload the catalyst therein to obtain incomplete conversion with concomitantly high yields of elemental carbon, and wherein in the second stage the effluent from the first stage is converted substantially to completion, whereby higher throughputs are achieved than heretofore with concomitantly increased rate of production. In another aspect this invention relates to a two stage process for conversion of hydrocarbons heavier than methane and to the use of successive catalytic and thermal catalytic zones in one or both stages. In still another aspect this invention relates to a process using a new technique of restricted catalytic reaction which may be preceded or followed by a noncatalytic thermal reaction in a first stage and followed by a catalytic and/or thermal reaction in a second stage.

The prior art, in the cracking of methane with steam to produce hydrogen-rich gas product, employing catalytic tubular processes, has advanced to an outstanding state of economic use, providing hydrogen gas of high purity substantially free from carbon, olefinic, and acetylenic compounds. The constant composition of the clean gas obtained insures freedom from penalty in subsequent process steps in which the gas is utilized. Thus, steps employing precipitators, filters, and/or washers and the like are unnecessary in such subsequent operations.

However, the successful cataltyic cracking of unsaturated hydrocarbons and oils with steam, in the production of hydrogen, requires special techniques in order that clean gas of constant and desired composition can be obtained for subsequent use without the need for auxiliary processing to remove carbon particles or to otherwise cope with impurities present. Hydrocarbon oils, when subjected to catalytic cracking with steam, do not generally submit to the same steady state lack of penalty type operation as is characteristic of methane cracking, and require, therefore, adaptations of temperature, catalyst, space velocity, capacities, and use of steam, different from those of the methane-steam reaction. Thus, with steam-cracking hydrocarbon oils it is advantageous to empoy higher temperatures and a weight ratio of steam to carbon such as about 4.5:1 or higher, which, of course, is considerably higher than that of about 2:1 employed in steam-methane cracking. The residence time at atmospheric pressure and at reaction temperature has been about 0.7 second or higher to provide only about half the quantity of hydrogen as can be obtained in the same equipment when steam-cracking methane, for example over a nickel catalyst.

In the catalytic cracking of hydrocarbon oils to produce hydrogen, certain amounts of carbon tend to deposit on the catalyst and when employing nickel catalyst, there is normally a poisoning effect from sulfur. Various techniques have been employed in the art for overcoming these objectionable features and as a result lower throughputs are required, than can be employed in catalytic steam-methane cracking, together with shorter, undisturbed catalyst life and cyclic operation.

A result of impaired operation in the production of hydrogen that occurs when employing the normal residence times of steam-methane cracking, for oil-steam cracking in prior art tubular processes, is the formation of unsaturates, condensables, and free carbon which may appear together in the product gas. Such materials in the product serve to penalize subsequent process steps such as carbon monoxide conversion, liquefaction, and the like. In the past it has been the practice in the art to reduce the throughput of the feed stock, i.e. the quantity of feed stock per unit of catalyst, either initially or as the catalyst becomes impaired, in order to obtain a product gas substantially free from elemental carbon. By either procedure, the process becomes correspondingly less economical.

It is known in the art that when catalytically cracking oil in the presence of stream in a tubular furnace, the technique used in the preheat zone is important, prior to reactants reaching a reaction temperature sufficient for production of hydrogen. The best techniques known to the art minimize formation of detrimental carbon. However, catalyst used in such processes may in itself to be a cause for carbon accumulation at and near the top of the catalyst bed, and resort has been had to fluid bed techniques to in part offset the effect of build-up of resistance to the flow of reactants. This pressure build-up is primarily at the top of the catalyst column where there exists normal pressure drop due to the flow of gases through the catalyst bed, plus an additional pressure drop due to carbon accumulation. The latter has been found to increase with time, and finally to mount rapidly as the passageways between catalyst particles tend to become sealed to gas flow. It has been necessary to purge such blockage by use of steam, air or mixtures of the two and only after reduction of the blockage to resume gas flow. This purge period can be regarded as either the beginning or the end of a cycle, and the length of cycle may be hours, days, weeks, or months, depending upon the composite circumstance.

There has been a world-wide increase in interest in the catalytic production of hydrogen from gases containing unsaturates in excess of 10% by volume, and even more so in production from oil, particularly from heavier grades of oil. There is substantial demand for a steam-hydrocarbon catalytic process so improved over the known art that the deficiency of throughput and impaired operation would be somehow overcome, but there has to date been no fulfillment of that need. The steam-methane process has set a high standard and there is a real need for an oil cracking process with near comparable throughput that gives practical assurance to sustained quality gas, free from undesirable unsaturates, hydrocarbon condensables, and free carbon without need for precipitation, filtering, or washing equipment. The preferred product gas is a quality stream at high temperature suitable for direct passage to heat recovery or further chemical processing equipment.

In my U.S. Patent Re. 21,521, issued July 30, 1940, on U.S. 2,173,984, issued September 26, 1939, I have described a tubular-type furnace now widely used in the art. In processing unsaturates, hydrocarbon oils, and particularly sulfur polluted hydrocarbon oils to produce hydrogen-rich gas product in such a tubular-type furnace, there is not the complete uniformity of performance between tubes that is preferred. In addition the staggered use of the purge, by groups of operating tubes, causes the operation to be one wherein the effluent gas is actually a composite of different streams from the various tubes, which may be individually widely different. To date, efforts have been directed to preventing contamination of the composite by, for example, unsaturates from a single tube. The result is a limited capacity which is not the desired answer to the problem. There has been strong need to open up the range of capacity, while incorporating dissimilarity of tube performance into a homogeneous process as a whole, while introducing flexibility to the operation, and while producing clean and high quality gas free from carbon, unsaturates, and condensable hydrocarbons.

This invention is concerned with a process suitable for the manufacture of hydrogen, acetylene, olefins or aromatics productively stable under the conditions of operation of the process, from $C_2$ and heavier hydrocarbons, and preferably from hydrocarbon oils, with substantially improved operation over long periods.

An object of this invention is to provide for catalytic conversion of hydrocarbons heavier than methane. Another object is to provide a two stage process for the catalytic preparation of hydrogen. Another object is to provide for higher throughputs in a catalytic hydrocarbon cracking process than employed heretofore. Another object is to provide a two stage process for the catalytic conversion of hydrocarbon oils. Another object is to provide for an improved utilization of nickel catalysts in the conversion of sulfur-bearing hydrocarbon stocks to hydrogen-rich product. Another object is to provide a catalytic process for the manufacture of hydrogen in high purity and yield from hydrocarbon oils, employing unimpaired operation with results characteristic of those of steam-methane cracking. Other aspects and objects are apparent in light of the accompanying disclosure and the appended claims.

In accordance with this invention, a hydrocarbon feed at least partially unsaturated is passed together with an oxidizing gas in contact with a fixed bed of a hydrocarbon cracking catalyst in a reaction zone at a temperature at least as high as the minimum temperature that would be suitable for cracking said feed in the presence of said catalyst to produce effluent substantially free from elemental carbon, but at reactant flow rates sufficiently high as to cause overloading of the catalyst and concomitant retention of elemental carbon in the resulting effluent, whereby higher throughputs for said catalyst are achieved than heretofore and said effluent is especially suitable for further conversion to product free from carbon. Also in accordance with this invention, a process is provided for the catalytic conversion of a hydrocarbon feed at least partially unsaturated in which are obtained higher throughputs and higher production rates, per unit of catalyst, than achieved heretofore, the said process comprising passing such a hydrocarbon feed, together with an oxidizing gas in contact with a fixed bed of granular hydrocarbon cracking catalyst at a temperature at least as high as the minimum temperature that would be suitable for effecting cracking of said feed in the presence of said catalyst to produce effluent substantially free from elemental carbon, but at a contact time sufficiently short so as to cause elemental carbon to be retained in resulting effluent, and then reacting said resulting effluent to form product substantially free from elemental carbon. Further, in accordance with this invention, a hydrocarbon feed containing unsaturates is reacted in two stages wherein at least in the first stage there is a succession of noncatalyst and catalyst zones, by passing the hydrocarbon feed in the first stage at a temperature that would be suitable for effecting cracking of said hydrocarbon in presence of said catalyst to produce effluent substantially free from elemental carbon, but at a space velocity sufficiently high to overload the said catalyst to cause elemental carbon to be retained in resulting effluent, and then passing said effluent through the second stage to substantially completely react said effluent therein.

My invention is based on my discovery that in contrast to what has been considered a necessary practice in the art heretofore, I can deliberately increase the quantity of feed stock per unit of catalyst, by overloading the catalyst to cause incomplete conversion yielding quantities of elemental carbon, unsaturates, and/or condensables without there being any appreciable greater depth or quantity of catalyst inactivated than results when employing normal catalyst loadings under the same temperature conditions. I have found this to be particularly true in respect of conversion of sulfur-containing hydrocarbons. Thus, it would have been expected that impairment of catalyst activity by reactant sulfur-containing compounds would have occurred at the higher throughput rates and that the inactivation would carry deeper into the catalyst bed so that pressure build-up would be more rapid, thereby resulting in shorter cycles, greater percentage of catalyst impairment, lower net hydrocarbon throughput per unit of catalyst and lower ultimate yield of desired product.

However, I have found that when overloading the catalyst in accordance with my invention, no appreciable increase in rate of catalyst inactivation occurs and surprisingly the higher space velocity, as a result of overloading, has the effect of carrying the carbon formed deeper into the catalyst bed permitting further reaction of same to form carbon oxides and permitting greater poundage accumulation in the catalyst before reaching the same pressure build-up that occurs under normal catalyst loading conditions, i.e., at conventional space velocities, before requiring purge by steam, air or mixtures thereof.

Further, I have found that in the practice of my invention a higher percentage of the deposited carbon reacts with steam, when the latter is employed, in the hotter portions of the catalyst into which it is carried. Such extended reaction of carbon in the catalyst bed together with the carrying of carbon from the catalyst in the effluent, at the higher space velocities of my invention provide for a sought after improvement in this art whereby throughput, particularly when processing sulfur-containing feed streams, has been substantially increased.

My invention is advantageously applied to normally liquid hydrocarbons. Exemplary of oil feeds employed are: naphtha, kerosene, distillate oils, crudes and residues. Introductory temperatures, mechanical means, and use of a vehicle such as steam are adapted to the particular feed stock within means known to the art.

By way of further example, a hydrocarbon oil having an A.P.I. gravity of about 32 was passed through a fixed bed of granular catalyst under conditions set forth in Table I, following. The temperatures shown are those of the type 310 metal tube used, identified approximately adjacent the inlet to the reaction zone (#1), about central of the reaction zone (#2), and toward the outlet of the reaction zone (#3). Capacity is expressed in the second column in terms of pounds of oil per hour per cubic foot of catalyst, there being approximately 0.35 cubic feet of catalyst per foot of catalyst depth.

*Table 1*

| Run No. | Lbs. Oil/ Hr./Cu. Ft. Catalyst | P.s.i. Increase/ Hr. | Percent of Oil Feed to Free Carbon | Catalyst Depth Tube Length, feet | Temperature [1] | | |
|---|---|---|---|---|---|---|---|
| | | | | | 1 | 2 | 3 |
| 1 | 8.4 | .25 | .3 | 18 | 2,000 | 1,980 | 1,894 |
| 2 | 8.9 | .8 | 13.4 | 18 | 2,001 | 1,965 | 1,743 |
| 3 | 8.7 | 1.4 | 18.4 | 18 | 2,036 | 1,808 | 1,444 |
| 4 | 19.2 | 0.1 | 15.8 | 15 | 1,961 | 1,929 | 1,814 |
| 5 | 19.0 | .6 | 25.4 | 15 | 2,020 | 1,886 | 1,659 |
| 6 | 18.9 | .5 | 26.4 | 15 | 2,013 | 1,888 | 1,505 |
| 7 | 28.9 | 1.5 | 27.9 | 10 | 1,992 | 1,949 | 1,781 |

[1] Inlet, central, and outlet points.

It is to be noted, in light of data of Table I, that when feeding oil at a rate of from 8.4–8.7 the rate of carbon buildup and the percent of free carbon formation are typical of those encountered in the prior art. It would be expected that when employing oil feed rate of from 18.9–19.2, of runs 4–6, a correspondingly high pressure drop increase would develop as a function of increased carbon formation. As shown with reference to Examples 4–6, however, an expected amount of free carbon formation occurs but the rate of pressure increase per hour that would be expected in view of the increase in carbon formation is nevertheless in the order of that obtained when utilizing an oil feed rate of 8.4–8.7 of runs 1–3. Further, when increasing the said feed rate to 28.9 as set forth with reference to run 7 the rate of pressure build-up is again of the same order as that of runs 1–3 employing a conventional feed rate of from 8.4–8.7.

The data of Table I illustrate the discovery of my invention, namely that I can increase the flow of hydrocarbon feed through the catalyst zone in the first stage at a contact time shorter than that heretofore employed in the art under which conditions incomplete reaction takes place to form significant yields of free carbon, but at the same time a low resistance build-up, characteristic of that of lower space velocities of the prior art, is maintained. Carbon and heavier materials thus formed have been driven into the catalyst bed for further reaction or through the catalyst bed and removed from the bed with total effluent. These results are obtained in accordance with my invention even though I may operate at unusually short contact times and produce considerable free carbon and substantial quantities of unsaturates, condensables, and the like. Thus, by way of example, when employing a flow of 150 lbs. of hydrocarbon oil feed (70° to 600° F.) per hour through an 8 inch tube containing a 15 foot depth of catalyst to obtain, say about a 25–30 weight percent yield of carbon, a substantial proportion of the carbon leaves the catalyst zone of the first stage with effluent so that the net result is a nondetrimental carbonizing step as part of the two stage process of this invention.

A number of test runs, exemplifying first stage operation, were conducted in a vertical commercial 8 inch diameter cracking tube about 25 feet in length, operated under prior art conditions of temperature and pressure for cracking hydrocarbon oils to produce hydrogen. A 32 A.P.I. oil having a sulfur content of about 0.3 weight percent was in each run, steam-cracked in the presence of nickel as a catalyst under the conditions tabulated in Table II, following.

impairment of catalyst activity, a substantial increase in B.t.u./hr. output can be successfully obtained with substantial operating and economic advantage. With reference to run 10, the input of feed stock was 1.85 times that of run 9 and markedly less impairment of catalyst activity occurred during run 10, even though there was substantially more free carbon produced, an manifest by the very low increase in pressure drop obtained, instead of a much higher resistance that would be expected. These data show that the bulk of the extra free carbon formed did not react detrimentally to tube performance and issued as dry product in the heated effluent gas. Had this unexpected result not been the case, the beneficial high throughput would not have been obtained.

By way of further illustration of the invention, an oil having a boiling range of from about 400° to 800° F. and a A.P.I. gravity of about 32° and containing about 0.26 weight percent sulfur, together with steam in a weight ratio to oil of about 4:1, is passed at the rate of about 150 lbs. of oil per hr. through a 6 inch to 10 inch tube containing as a catalyst a 10 foot bed of nickel-magnesia, zirconium silicate at an inlet gas temperature to the reaction zone of about 950 to 1400° F. and an outlet temperature of about 1400 to 2000° F. and at a space velocity sufficiently high to provide a maximum contact time of 0.3 second. Under these conditions, in the order of about 25 volume percent of the oil feed is converted to free carbon and about 11 grains of condensable hydrocarbons or tar will be present per cubic foot of effluent gas. Substantially all of the free carbon and hydrocarbons formed, together with unreacted hydrocarbon, are carried from the catalyst tube with the gas effluent. This amount of free carbon is substantially in excess of that which would have been formed had conversion conditions been selected for effecting substantially complete conversion in the catalyst tube, in accordance with prior art methods. The resulting effluent is then passed through a fixed bed of a suitable catalyst preferably a nickel-type catalyst at an inlet temperature in the range of about 1400 to 1900° F., an outlet temperature up to about 2000° F. and at a space velocity to give a contact time up to about 3 seconds whereby all or substantially all the free carbon, unreacted hydrocarbon, and heavy hydrocarbon components are converted to hydrogen, carbon monoxide, and carbon dioxide. This effluent can then be passed through one or more stages of shift converter, or otherwise processed by conventional procedures to yield the quality of gas desired.

Had conversion process conditions been employed in

Table II

| Run No. | Input Reactant Space Velocity at NPT | Lbs. Oil Per Hr. | P.s.i. Increase | Percent Unsaturates in Effluent Gas | Percentage of Feed to Carbon | Depth of Tube, feet | Terminal Tube Metal Temperature, °F. | Product B.t.u. (Heat Value) Per Hr. |
|---|---|---|---|---|---|---|---|---|
| 8 [1] | 500 | 45 | 0.1/120 hr | Zero | | 18 | 1,985 | 708,000 |
| 9 [2] | 700 | 78 | 0.4/hr | 2.0 | 11 | 18 | 1,986 | 1,727,000 |
| 10 | 2,100 | 144 | 1.0/hr | 11.3 | 28 | 15 | 1,993 | 2,515,000 |

[1] About 3500 cubic feet hydrogen produced per hour.
[2] About 4000 cubic feet hydrogen produced per hour.

As shown with reference to run 8, employing a space velocity of 500, unsaturates appeared in the product gas after 120 hours of operation so that at that time, to produce a normal purity gas, a reduction in the throughput would have been necessary. During the time prior to reduction of throughput, gas of combustion heat value of 708,000 B.t.u./hr. was obtained and any reduction in throughput would have lowered this value. I have found that by deliberately overloading the catalyst prior to a single stage for forming clean hydrogen product, only about 30 to 60 lbs. per hr. of oil feed would have been processed.

The foregoing embodiment and data herein demonstrate that instead of accepting as final a lower throughput when catalytically steam-cracking hydrocarbons heavier than methane, i.e. than characteristic of steam-methane cracking, higher throughputs can be obtained by overloading the catalyst.

Contact times employed in the first stage of my process are below those of the prior art required for effecting reaction of the particular hydrocarbon feed to form clean gas product in the presence of the particular catalyst employed, i.e. substantially free from free carbon, olefins or condensables. The contact time is therefore generally below 0.2 second, being up to as high as 0.3 second, depending on the specific feed and catalyst employed.

Although I have referred herein to overall conditions of time and temperature for effecting substantially complete conversion of hydrocarbon feed to clean gas product, I am aware that in some instances it may be preferred that some carbon be present in the second stage gas effluent, whereas my preferred operation is to yield clean gas. However, when referring herein to incomplete conversion as a result of overloading the catalyst in the first stage it is meant such conversion that results in formation of substantial yields of free carbon say up to about 30 percent.

Thus, in contrast to the prior art methods wherein the clean gas is substantially free from free carbon and/or hydrocarbon condensables the product of incomplete conversion in the first step of my process may contain from about 1 to 20 percent unreacted hydrocarbon, from about 4 to 35 percent free carbon, and from about 0 to 20 and upward grains of hydrocarbon condensables, per cubic foot of effluent with hydrogen and carbon oxides in the remainder, together with any nitrogen introduced with feed into the first stage.

Reforming or cracking temperatures employed in the first stage of my process are at least as high as those required in the prior art for effecting complete conversion of the particular feed stock to clean gas product and are generally above 1200° F., and preferably above 1350° F. However, when employing sulfur-bearing feed stocks, as for example a fuel oil containing sulfur in the presence of say a nickel type catalyst, the prior art will employ a temperature above about 1300° F. and generally in the order of about 1650° F. or higher to complete the said conversion and, accordingly, a minimum of about 1300° F. is employed in the first stage of my process when charging such feed stock. Top temperatures employed are limited more often by practical considerations being generally not above about 2200° F.

Although any suitable oxidizing gas can be employed in the practice of my invention, e.g. steam, air, oxygen, carbon dioxide or the like, I prefer to employ steam and utilize any suitable proportions. I can also use combustion gases or effluent gases from the processes which contain oxides of nitrogen. Steam is advantageously employed in a weight ratio to hydrocarbon oil feed of at least 2:1 and upwards to 4:1 or 5:1 or higher if desired. Commensurate proportions of other oxidizing gases can be employed consonant with known hydrocarbon cracking procedures employing an oxidizing gas.

Exemplary of conversion catalysts that can be employed in the first stage of my process are nickel-magnesia-zirconia; nickel-magnesia-alumina; nickel on alumina; nickel on diaspore; and alkaline earth catalysts such as lime magnesite. However, any suitable hydrocarbon cracking catalyst can be employed. These catalysts are also exemplary of catalysts that can be used in the herein described second stage operation of my invention.

Effluents from stage 1 are introduced into stage 2, which can be in one embodiment a partial oxidation stage utilizing air or oxygen with or without additional steam and preferably catalytic, in order to bring about high temperature reaction primarily to purify the gas as to free carbon, hydrocarbon condensables, unsaturates, and at least a major proportion of any other unreacted hydrocarbon present. Carbon, unsaturates, and condensables of stage 1 are converted in the presence of hydrogen and methane to clean gas product in stage 2.

In another embodiment, the effluent from stage 1 can be reacted preferably noncatalytically in stage 2 to produce effluent containing hydrogen and one or more of acetylene, ethylene, and benzene, or in general, unsaturates and aromatics. Thus, dependent on the principal desired end product a suitable temperature for the formation thereof is employed in the second stage.

In the second stage, total effluent from the first stage is reacted so that there is an overall increase in the degree of conversion of the original feed stock. Temperatures employed in the second stage are those known in the art for effecting reactions of hydrocarbons. Generally, a temperature in the range of from about 1100°–2200° F. is advantageously employed when a catalyst is utilized and higher temperatures over a broader range, say 1100°–3000° F. are employed when noncatalytic reactions are carried out.

In the second stage I react quantities of unsaturates and condensables from stage 1 in the presence of hydrogen and methane issuing from stage 1 at temperatures in excess of 1100° F., while reacting said mixture in stage 2 at temperatures between 1100° F. and 3000° F., supplying any additionally required heat by well known partial combustion techniques, by heat exchange, by dilution with externally supplied hot gases or any combination thereof. Close coupling of the two stages is preferred in the practice of my invention particularly for hydrogen manufacture. By this arrangement I maintain a high proportion of $H_2$ in the reacting gases of stage 2, relative to the concentration of $C_2H_2$, $C_2H_4$ or aromatics.

To the second stage I can introduce any hydrocarbon, air, oxygen or steam, whenever it is desired to do so to increase the yield of final product, particularly exothermically reacting oxidizing gases to facilitate increase in temperature for production of acetylene. The said hydrocarbon can initially be a liquid provided sufficient air or oxygen is added to satisfy the condition of rising temperature in stage 2. Under said conditions such externally introduced reactants and heat supply media will mix with the hot hydrogen stream from stage 1, with equilibria and reaction influenced thereby.

Contact time in the second stage is generally in the range of from about 1/10 second and upwards, often as high as 3 seconds or higher based on atmospheric pressure and actual reaction temperature employed.

Reaction conditions well known in the art for producing desired product are employed in stage 2. Thus, when directing the reaction toward acetylene production, the reaction is noncatalytic, and temperatures are in the upper part of the preferred 1100–3000° F. range or higher, preferably at least about 2500° F., the time being relatively short, e.g. in the order of 0.1 second or less. Lower temperatures are employed in the catalytic production of olefins, particularly ethylene, preferably from 1100° F. to say 2500° F. or higher at a time varying from about 0.2 second to about 1 minute. Longer reaction times, e.g. up to 3 minutes at intermediate temperatures in the 1100–3000° F. range, e.g. 1400–1700° F. are advantageously employed in the formation of aromatic products. Production of hydrogen is favored at temperatures say in the order of 1100–1700° F. in the presence of a catalyst and higher when a catalyst is not employed, e.g. 1800–2400° F. Reaction time is generally from 1 to 2 seconds.

In carrying out one embodiment of the two stage process of this invention I employ a succession of catalyst and noncatalyst zones in the first stage and when desired, in both stages. In any event, there are at least two catalyst zones when employing a succession of catalyst and noncatalyst zones.

The noncatalytic zones generally comprise open spaces. This is particularly advantageous in that when conducting a highly catalytic endothermic reaction there is a noncatalytic space of less endothermic reaction to provide for a redistribution of heat before resuming the catalytic reaction. The result is a more uniform reaction. Also, flow of gases from a catalytic zone through an adjacent noncatalytic space provides for correction of any channeling effects and thereby for a redistribution of gases prior to resuming the catalytic reaction.

With reference to the presence of nitrogen in effluent gases and to use of nitrogen oxides in the feed as above discussed, it is sometimes desirable to employ by-product gases of other processes, in the feed, to provide end gases containing nitrogen. Such by-product gases may contain oxides of nitrogen as from ammonia oxidation plant stack gases; or from combustion gases. Where such oxides of nitrogen are so employed, I introduce them into either the first or second stage or both. Catalysts mentioned above are satisfactory in the presence of hydrogen and at the reaction temperatures specified to purify the product gas of said oxides of nitrogen.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. A process for the conversion of hydrocarbons comprising passing a hydrocarbon feed at least partially unsaturated together with an oxidizing gas selected from the group consisting of steam, carbon dioxide and a free oxygen-containing gas in contact with a fixed bed of granular hydrocarbon cracking catalyst in a reaction zone at a temperature at least as high as the minimum suitable for effecting cracking of said feed in presence of said catalyst to produce effluent substantially free from elemental carbon, but at a contact time sufficiently short as to cause elemental carbon to be retained in resulting effluent, and then reacting said resulting elemental carbon-containing effluent, in the presence of an oxidizing gas of the kind above described, to form hydrocarbon conversion product substantially free from elemental carbon.

2. A process of claim 1 wherein said temperature is at least 1200° F. and said contact time does not exceed 0.3 second.

3. A process of claim 2 wherein said hydrocarbon is an oil, steam is passed together with said oil through said catalyst bed, and said effluent is reacted with an oxidizing gas to form carbon monoxide and hydrogen.

4. A process of claim 3 wherein said oil is sulfur-bearing, said temperature is at least 1300° F., and said oxidizing gas is steam.

5. A process for the conversion of hydrocarbons comprising passing a hydrocarbon oil, in vapor phase, in contact with a nickel catalyst, in the presence of steam, at a temperature of at least 1200° F. at a contact time not exceeding 0.3 second, and then reacting resulting total elemental carbon-containing product with steam to form hydrogen and carbon monoxide.

6. A two-stage process for production of hydrogen, comprising in a first stage passing a hydrocarbon oil, at least partially unsaturated, in vapor phase, in contact with a fixed bed of a granular nickel hydrocarbon cracking catalyst at a temperature of at least 1200° F. and a contact time not exceeding 0.3 second, passing steam through said catalyst bed together with said oil in a weight ratio to said oil within a range of about 2:1 to 5:1, whereby said catalyst has been overloaded to cause elemental carbon and product condensables to be retained in resulting effluent; in a second stage passing resulting elemental carbon-containing effluent through a fixed bed of a granular nickel catalyst at a temperature of at least 1100° F. and a contact time of at least 0.1 second, whereby hydrogen and carbon monoxide are formed in high yield, and recovering said hydrogen.

7. A process of claim 6 wherein said oil is sulfur-bearing, and said first stage temperature is at least 1300° F.

8. A process of claim 6 wherein the water gas equilibrium in effluent from said second stage is shifted to the $CO_2$ side and wherein $CO_2$ is then removed to provide residual hydrogen as product of the process.

9. A two-stage process for the conversion of hydrocarbons comprising in a first stage passing a hydrocarbon oil in vapor phase in contact with a hydrocarbon cracking catalyst at a temperature of at least 1200° F. and at a contact time not exceeding 0.3 second, together with steam in a weight ratio to said oil of at least 2:1, whereby said catalyst has been overloaded to cause formation of effluent containing a substantial amount of elemental carbon and product condensables which are substantially completely retained in resulting effluent; in a second stage reacting resulting elemental carbon-containing effluent at a contact time of at least 0.1 second and at a temperature within the range of 1100–3000° F. to produce hydrocarbon conversion product substantially free from elemental carbon, and recovering said product.

10. A process of claim 9 wherein said second stage reaction is conducted at a temperature in the range of from 2000° to 3000° F. at a contact time not exceeding about 0.1 second, whereby said product contains acetylene in substantial yield.

11. A process of claim 9 wherein said second stage reaction is conducted in presence of a hydrocarbon cracking catalyst at a temperature in the range of from 1100 to 2500° F. and a contact time not exceeding about 0.2 second to about 1 minute, whereby said product contains olefins in substantial yield.

12. A process of claim 9 wherein said second stage is conducted in the presence of a hydrocarbon cracking catalyst at a temperature in the range of from 1400 to 1700° F. and a contact time not exceeding about 3 seconds, whereby said product contains aromatics in substantial yield.

13. A process of claim 9 wherein said second stage is conducted in presence of a hydrocarbon cracking catalyst at a temperature in the range of from 1100 to 1700° F. and a contact time not exceeding about 1 to 2 seconds, whereby said product contains hydrogen in substantial yield.

14. A process of claim 1 wherein at least one of said first and second stages contains a succession of catalytic and noncatalytic zones and contains at least two catalytic zones, the catalyst in each said catalytic zone being a hydrocarbon cracking catalyst.

15. A process for the conversion of hydrocarbons comprising passing a hydrocarbon oil, at least partially unsaturated, together with steam in a weight ratio to said oil within the range of 2:1 to 5:1, through a fixed bed of hydrocarbon cracking catalyst in a reaction zone at a temperature of at least 1200° F. for a contact time not exceeding 0.3 second so as to overload the said catalyst and concomitantly retain elemental carbon in the resulting effluent, whereby hydrocarbon conversion effluent containing elemental carbon is provided which is especially suitable as a feed stock for conversion to product free from carbon.

16. A process of claim 9 wherein a gas containing oxides of nitrogen is introduced into at least one of said stages and is passed in contact therein with a hydrocarbon cracking catalyst in the presence of hydrogen from said first stage and said elemental carbon whereby the said oxides are reacted to form nitrogen.

17. A process of claim 15 wherein a gas containing oxides of nitrogen is introduced into said reaction zone and is reacted with hydrogen therein to form nitrogen.

18. A process of claim 9 wherein a hydrocarbon stream together with at least one oxidizing gas selected from the group consisting of a free oxygen-containing gas, steam, and carbon dioxide is introduced into said second stage to supplement said effluent as a reactant in said second stage.

(References on following page)

References Cited in the file of this patent

UNITED STATES PATENTS

| | | |
|---|---|---|
| 1,736,065 | Williams | Nov. 19, 1929 |
| 1,874,801 | Porter | Aug. 30, 1932 |
| 1,904,908 | Voorhees | Apr. 18, 1933 |
| 1,957,743 | Wietzel et al. | May 8, 1934 |
| 2,013,699 | Richardson | Sept. 10, 1935 |
| 2,199,475 | Wilcox | May 7, 1940 |
| 2,628,890 | Shapleigh | Feb. 17, 1953 |